United States Patent [19]
Oxley

[11] Patent Number: 4,715,168
[45] Date of Patent: Dec. 29, 1987

[54] HEIGHT ADJUSTMENT FOR A FRONT MOUNT MOWER

[75] Inventor: Lonnie R. Oxley, West Bend, Wis.

[73] Assignee: Deere & Company, Moline, Ill.

[21] Appl. No.: 862,862

[22] Filed: May 13, 1986

[51] Int. Cl.⁴ .................. A01D 34/04; A01D 34/64
[52] U.S. Cl. .................................. 56/15.8; 56/15.9; 56/17.2
[58] Field of Search .............. 56/15.2, 15.8, 15.9, 56/17.1, 17.2, DIG. 22; 172/657; 111/56, 85; 280/405 B, 481, 496

[56] References Cited

U.S. PATENT DOCUMENTS

| | | | |
|---|---|---|---|
| 3,550,364 | 12/1970 | Musgrave | 56/15.8 |
| 3,657,866 | 4/1972 | Burroughs | 56/15.9 |
| 3,680,880 | 8/1972 | Blaauw | 56/DIG. 22 |
| 4,313,295 | 2/1982 | Hanson et al. | 56/15.8 |
| 4,325,210 | 4/1982 | Marto | 56/15.8 |
| 4,325,211 | 4/1982 | Witt et al. | 56/15.8 |
| 4,441,306 | 4/1984 | Kuhn | 56/17.1 |
| 4,563,019 | 1/1986 | Kuhn et al. | 56/DIG. 22 |
| 4,572,087 | 2/1986 | Brannan | 111/56 |
| 4,596,200 | 5/1986 | Gafford et al. | 111/85 |

Primary Examiner—James A. Leppink
Assistant Examiner—John F. Letchford

[57] ABSTRACT

A height adjustment device for a front mount mower including a support frame pivotally attached to the mower deck at the point where the rear of the mower deck is supported by push arms extending forward from the drive vehicle. The forward portion of the support frame carries a pair of ground engaging wheels and the forward end of the mower deck is disposed to be attached to and supported by the support frame at one of a number of vertically spaced positions. A cable connection between the push arms and the support frame automatically levels the rear of the mower deck with the adjusted level of the front of the mower deck.

4 Claims, 6 Drawing Figures

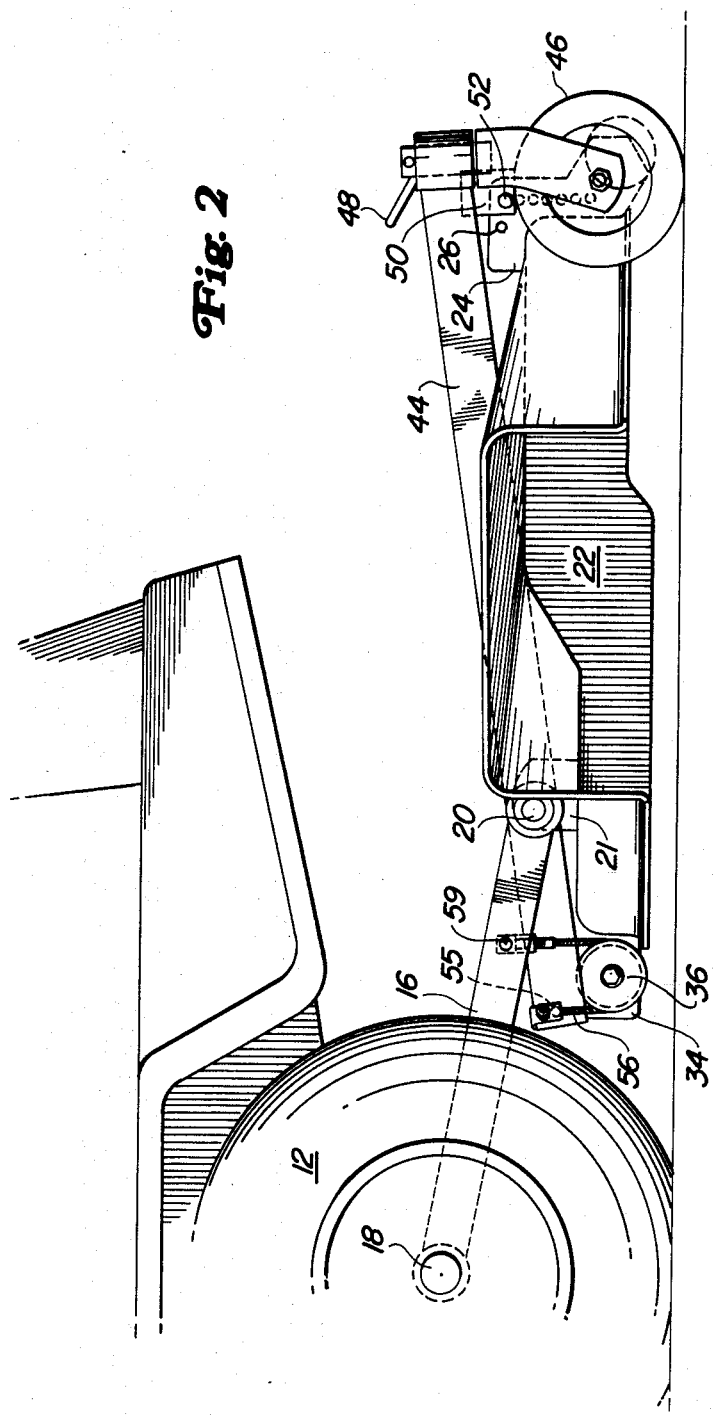

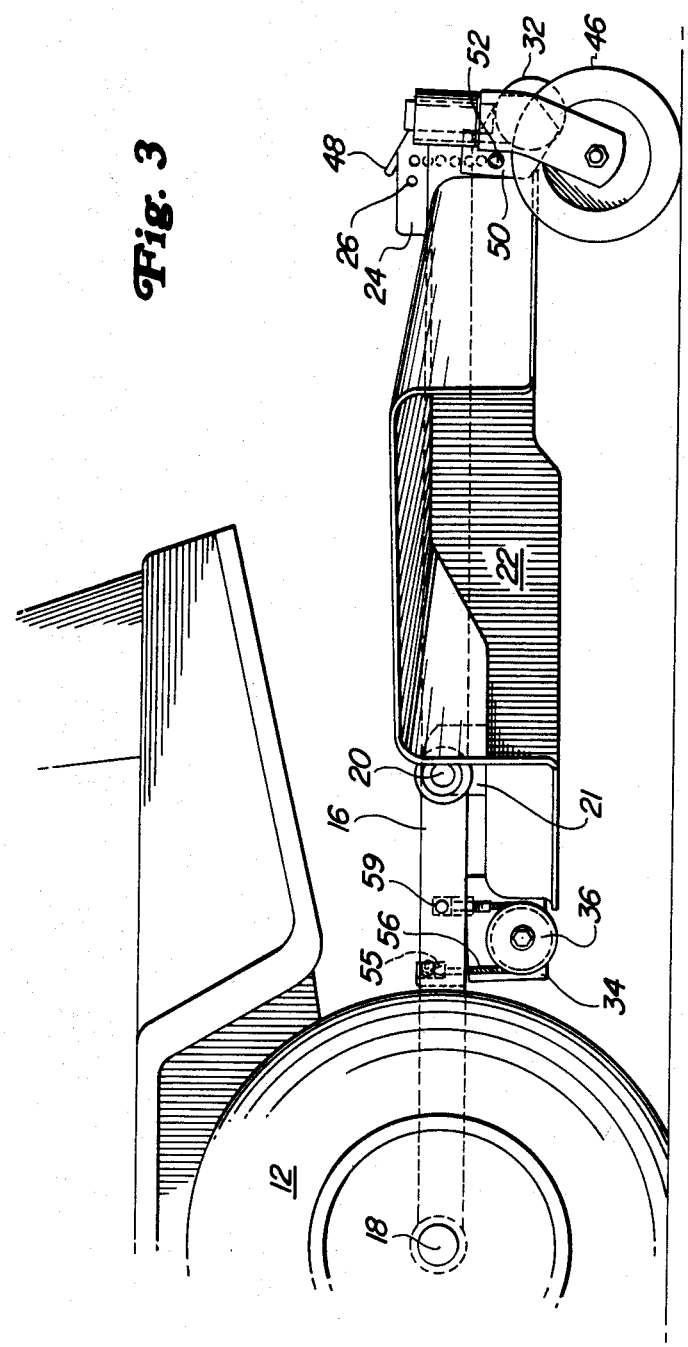

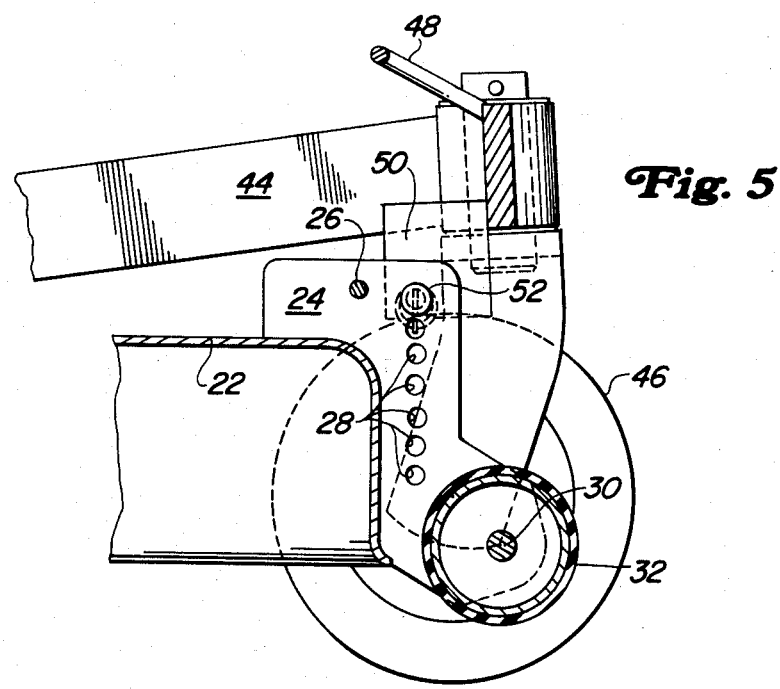
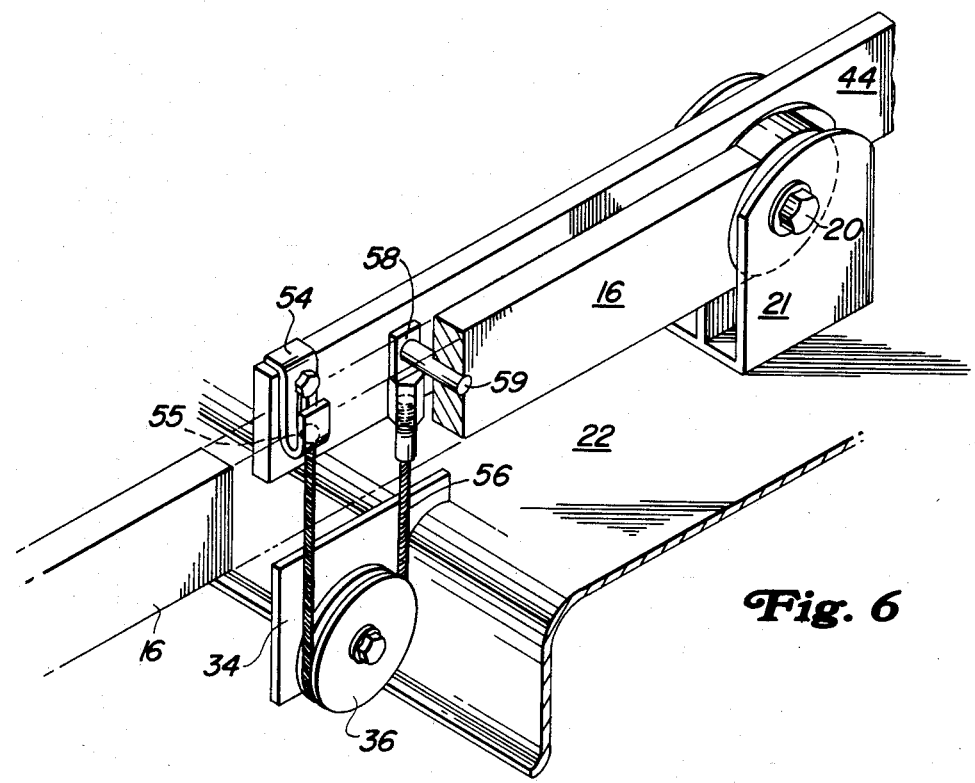

HEIGHT ADJUSTMENT FOR A FRONT MOUNT MOWER

TECHNICAL FIELD

This invention relates to implement height adjustments and more particularly to a low profile height adjustment for a front mounted riding mower.

BACKGROUND ART

In front mount mowers, it is desirable to provide for incremental adjustment of the cutting height. It is also desirable to provide a low deck profile for trimming under lawn obstacles and provide a safe, simple and convenient height adjustment. Currently known height adjustments for front mounted mowers either employ complex structures that are expensive to manufacture and maintain, or require numerous individual adjustments that consume valuable operator time.

Those concerned with these and other problems recognize the need for an improved height adjustment for a front mount mower.

DISCLOSURE OF THE INVENTION

The present invention provides a height adjustment device for a front mount mower including a support frame pivotally attached to the mower deck at the point where the rear of the mower deck is supported by push arms extending forward from the drive vehicle. The forward portion of the support frame carries a pair of ground engaging wheels and the forward end of the mower deck is disposed to be attached to and supported by the support frame at one of a number of vertically spaced positions. A cable connection between the push arms and the support frame automatically levels the rear of the mower deck with the adjusted level of the front of the mower deck.

The height adjustment device utilizes geometrically designed mechanical linkages to level the deck. The operator makes a single adjustment of the front of the mower deck and the support frame to selectively change mower cutting height.

An object of the present invention is the provision of an improved height adjustment device for a front mount mower.

Another object is to provide a height adjustment for a front mount mower that results in a low profile design.

A further object of the invention is the provision of a height adjustment for a front mount mower that is safe and convenient to use.

Still another object is to provide a height adjustment for a front mount mower that is inexpensive to manufacture.

A still further object of the present invention is the provision of a height adjustment for a front mount mower that is easy to maintain.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 2 is an enlarged side elevational view of the mower showing the mower deck adjusted at the lowest cutting level;

FIG. 3 is an enlarged side elevational view similar to FIG. 2 but showing the mower deck adjusted at the highest cutting level;

FIG. 5 is a greatly enlarged side elevation sectional view taken along line 5—5 of FIG. 4 showing the mower deck adjusted at the lowest cutting level; and FIG. 6 is a greatly enlarged perspective view having a portion of one push arm cut-away to show the cable connection between the push arm and the free end of the support frame arm.

BEST MODE FOR CARRYING OUT THE INVENTION

Figure 1:
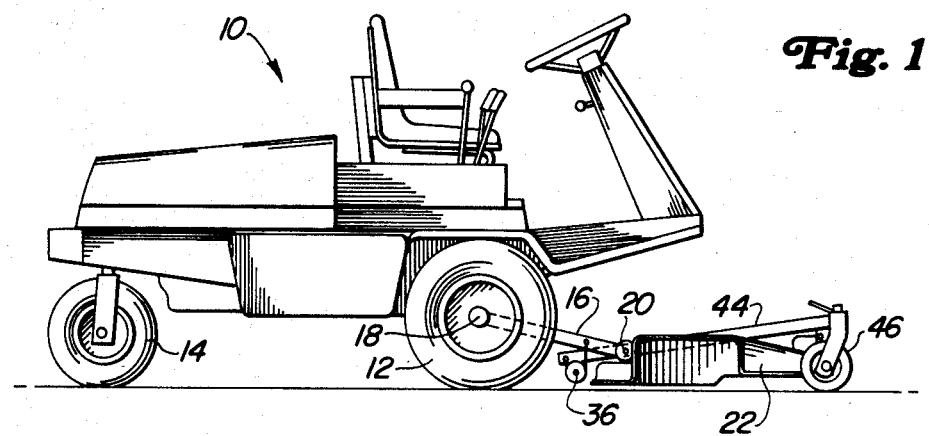
FIG. 1 is a side elevational view of a front mount mower utilizing the height adjustment device of the present invention.

Referring now to the drawings, wherein like reference numerals designate identical or corresponding parts throughout the several views, FIG. 1 shows a drive vehicle (10) supported by a pair of front drive wheels (12) and a single rear wheel (14). A pair of push arms (16) are pivotally connected to the front drive axle (18) and extend forward to a point of pivotal connection (20) in the bracket (21) extending up from the mower deck (22). The push arms (16) act to support the rear of the mower deck (22). The height adjustment mechanism of the present invention includes a support frame (40) and a cable connection between the push arms (16) and the support frame (40).

Figure 4:
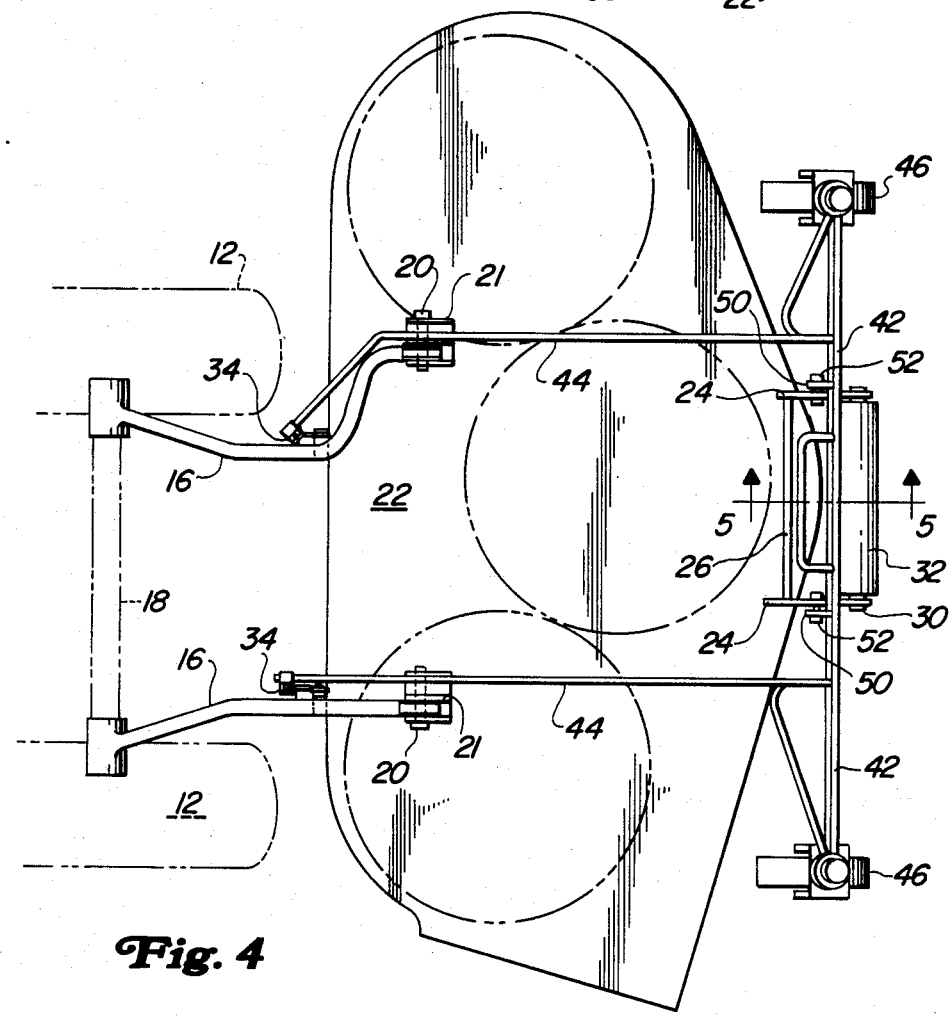
FIG. 4 is an enlarged top plan view showing the connection of the support frame and the fowardly extending push arms to the mower deck.

As best shown in FIGS. 4 and 5, a pair of adjustment plates (24) are welded in spaced relationship to the forward portion of the mower deck (22). A rod (26) is attached to and interconnects the top section of the plates (24) and serves as a hand-gripping member. Each of the plates (24) has seven vertical adjustment holes (28) spaced at one-half inch intervals. A shaft (30) is attached to and interconnects the lower section of plates (24) and rotatably supports an anti-scalping roller (32). Referring now to FIGS. 2–4 and 6, a pair of pulley brackets (34) are welded in spaced relationship to the rear portion of the mower deck (22). Each of the brackets (34) carries a rotatable pulley (36).

As most clearly shown in FIGS. 2 and 4, the mower deck support frame (40) includes a cross beam (42) and a pair of generally fore-and-aft directed deck beams (44). Each end of the cross beam (42) carries a ground engaging caster wheel (46). A loop handle (48) extends rearward from the central portion of the cross beam (42). A pair of rearwardly extending adjustment lugs (50) are attached in spaced relationship on the cross beam (42) and each includes an opening which is registerable with the adjustment holes (28) in the adjacent adjustment plate (24). Lock pins (52) are selectively engaged in one of the vertically spaced adjustment holes (28) in each of the plates (24) to lock the support frame (40) in one of the seven adjusted positions. Each deck beam (44) is pivotally connected at point (20) to brackets (21) and each has a free end extending over a pulley (36).

As best shown in FIG. 6, a slotted clip (54) is attached at point (55) near the free end of the deck beam (44) and receives an enlarged end of a cable (56). A threaded clip (58) is attached at point (59) to the push arm (16) and receives the threaded end of cable (56). For a given range of cutting height adjustment, the mower deck

(22) can be automatically maintained in a substantially level state by the cable (56) which interconnects the push arm (16) and the deck beam (44). For example, where the cutting height ranges from one inch to four inches, the mower deck (22) will automatically level in this three inch range if the distance betweeen point (20) and point (59) is about 76.4% of the distance between point (20) and point (55).

In operation, the height of the mower deck (22) is selectively adjusted to the desired height by simultaneously grasping the rod (26) and the loop handle (48) and disengaging the lock pins (52). If it is desired to raise the cutting level, the rod (26) and the handle (48) are pulled toward one another thereby raising the forward portion of the mower deck (22) with respect to the supporting caster wheels (46). The lock pins (52) are then positioned to engage the adjustment holes (28) to hold the desired cutting height. When it is desired to lower the cutting level, the rod (26) and handle (48) are grasped, the locking pins (52) disengaged and the mower deck (22) lowers by gravity as the grasp on the rod (26) and handle (48) is gradually released. When the desired cutting height is reached, the lock pins (52) are engaged to hold the desired cutting height.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. In a height adjustment device for a front mounted mower, said mower including a mower deck having the rear portion thereof supported by a pair or push arms pivotally attached to and interconnecting said mower deck and a drive vehicle, the improvement comprising:

a support frame pivotally attached to said mower deck at the point of pivotal attachment of said push arms to said mower deck, said support frame including ground engaging wheels disposed to support the forward end of said support frame, an adjustment bracket interconnecting said support frame and said mower deck and disposed to selectively engage and support the forward end of said mower deck at one of a number of vertically spaced positions, whereby the forward end of said mower deck is selectively supported on said ground engaging wheels; and means for automatically levelling the rear portion of said mower deck with the forward end of said mower deck, said leveling means being connected to said push arms and said support frame such that said rear portion is leveled relative to the forward end for each of the vertically spaced positions of the adjustment bracket.

2. A height adjustment and leveling device for a mower deck connected to a front mount mower, said mower deck having the rear portion thereof supported by a pair of push arms connected to and interconnecting said mower deck with said mower, said height adjustment and leveling device comprising:

a support frame having ground engaging wheels the foward end of said support frame connected to said mower deck;

a bracket, connected to said support frame and said wheels and having a plurality of vertical spaced adjustment means formed therein for adjusting the position of said forward end of said mower deck relative to said ground; and means, connected to said push arms and said frame for automatically leveling the rear end of said mower deck relative to said forward end of said mower deck for each position of said plurality of said adjustment means.

3. The height adjustment and leveling device of claim 2 wherein said automatic leveling means further comprises:

a first attachment means connected to said support frame;

a second attachment means connected to said push arms; and a cable, interconnecting said first and said second attachment means, for automatically maintaining said mower deck in a substantially level condition in response to the selection of each of said plurality of said vertical adjustment means.

4. The height adjustment and leveling device of claim 3 wherein, if the distance between the connection point of said push arms to said mower deck and said second attachment means is approximately 76.4% of the distance between said connection point between said push arms and said mower deck and said first connection means, said mower deck will automatically leved said mower deck within the range of 1 inch to 4 inches cutting height.

* * * * *

UNITED STATES PATENT AND TRADEMARK OFFICE
CERTIFICATE OF CORRECTION

PATENT NO. : 4,715,168

DATED : 29 December 1987

INVENTOR(S) : Lonnie R. Oxley

It is certified that error appears in the above-identified patent and that said Letters Patent is hereby corrected as shown below:

In claim 1, line 3, delete "or" and insert therefore -- of -- . In claim 2, line 7, after "wheels", insert -- for supporting -- . In claim 4, line 7, delete "leved" and insert therefore -- level -- .

Signed and Sealed this

Sixteenth Day of August, 1988

Attest:

DONALD J. QUIGG

Attesting Officer     Commissioner of Patents and Trademarks